United States Patent
Alsbrook, Sr.

[11] Patent Number: 5,567,455
[45] Date of Patent: Oct. 22, 1996

[54] SALAD SANDWICH AND METHOD OF MAKING

[76] Inventor: William N. Alsbrook, Sr., 6250 S. Harper Ave., Chicago, Ill. 60637

[21] Appl. No.: 299,307

[22] Filed: Sep. 1, 1994

[51] Int. Cl.$^6$ .............................. B65B 29/10; B65B 25/00
[52] U.S. Cl. ................. 426/115; 426/120; 426/122; 426/123; 426/124; 426/132; 426/138; 426/394; 426/283; 426/411
[58] Field of Search ................ 426/94, 120, 138, 426/115, 122, 123, 112, 132, 275, 279, 280, 281, 282–284, 394, 411, 124; 206/219, 221

[56] References Cited

U.S. PATENT DOCUMENTS

| | | | |
|---|---|---|---|
| 1,552,671 | 9/1925 | Bellocchio | 426/139 |
| 1,842,576 | 1/1932 | Bemis | 426/94 |
| 1,873,920 | 8/1932 | Bemis | 426/94 |
| 2,110,615 | 3/1938 | Wilcox | 426/115 |
| 2,132,966 | 10/1938 | O'Brien | 426/123 |
| 2,186,435 | 1/1940 | Serr | 426/90 |
| 2,240,522 | 5/1941 | Serr | 206/219 |
| 2,510,211 | 6/1950 | Cleary | 426/120 |
| 2,784,682 | 3/1957 | Clevenger | 426/94 |
| 2,819,738 | 1/1958 | Marberg | 206/219 |
| 3,043,424 | 7/1962 | Howard | 206/219 |
| 3,080,238 | 3/1963 | Kraft et al. | 426/123 |
| 3,088,586 | 5/1963 | Hardman | 206/221 |
| 3,355,082 | 11/1967 | Wood . | |
| 3,366,486 | 1/1968 | Weinstein et al. | 426/138 |
| 3,412,927 | 11/1968 | Baur | 426/123 |
| 3,575,337 | 4/1971 | Bernhardt . | |
| 3,656,968 | 4/1972 | Allen | 426/275 |
| 3,797,646 | 3/1974 | Horne | 206/219 |
| 3,821,425 | 6/1974 | Russell . | |
| 3,924,009 | 12/1975 | Goldberg | 426/132 |
| 3,955,001 | 5/1976 | Kuepach et al. | 426/122 |
| 4,018,905 | 4/1977 | Adamek . | |
| 4,143,165 | 3/1979 | Daswick | 426/120 |
| 4,233,325 | 11/1980 | Slangan | 426/107 |
| 4,251,553 | 2/1981 | Kobayashi | 426/120 |
| 4,264,629 | 4/1981 | Dogliotti . | |
| 4,390,553 | 6/1983 | Rubenstein | 426/138 |
| 4,390,554 | 6/1983 | Levinson | 426/107 |
| 4,472,440 | 9/1984 | Bank | 426/128 |
| 4,623,568 | 11/1986 | Suzuki | 426/115 |
| 4,874,618 | 10/1989 | Seaborne | 426/76 |
| 4,879,125 | 11/1989 | Pak | 426/138 |
| 5,012,971 | 5/1991 | Cozzi et al. | 426/115 |
| 5,128,157 | 7/1992 | Ruiz | 426/106 |
| 5,222,813 | 6/1993 | Kopp | 383/200 |
| 5,236,724 | 8/1993 | Burger | 426/94 |
| 5,251,809 | 10/1993 | Drummond | 229/202 |
| 5,281,027 | 1/1994 | Thrall | 383/88 |

FOREIGN PATENT DOCUMENTS

| | | | |
|---|---|---|---|
| 3611650 | 10/1987 | Germany | 426/275 |
| 3704192 | 8/1988 | Germany | 426/94 |
| 4129987 | 3/1993 | Germany | 426/115 |
| 4112751 | 4/1992 | Japan | 426/94 |
| 2203927 | 11/1988 | United Kingdom | 426/115 |

*Primary Examiner*—Steven Weinstein

[57] ABSTRACT

The invention comprises a salad sandwich and method of making the same where the salad sandwich is made of a baked edible shell that is open at one end and contains a tear-away bag which is filled with an appropriate sandwich fill. The tear-away bag keeps the sandwich fill fresh and prevents the sandwich fill from transferring moisture to the shell. The tear-away bag has a tear-away mechanism which, just before the salad sandwich is eaten, allows the bag to be removed in one step without removing the sandwich fill from the confines of the shell.

4 Claims, 5 Drawing Sheets

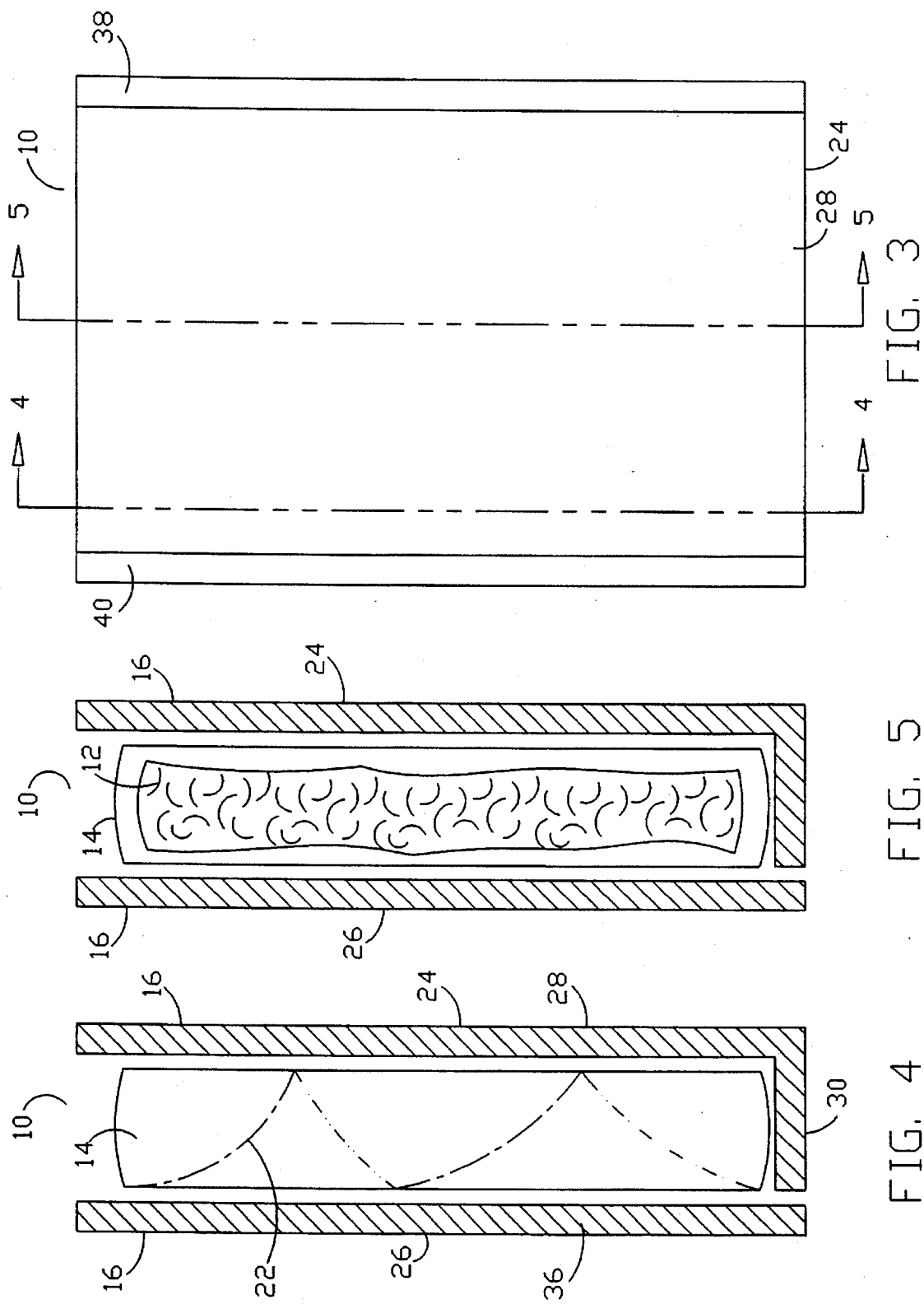

SALAD SANDWICH AND METHOD OF MAKING

BACKGROUND OF THE INVENTION

The present invention relates to food products, and particularly, to a food product having at least two individual food components which are separated until they are ready to be eaten.

In the fast-food retailing industry there is great need for packaged ready-to-eat food products that allow the consumer to combine previously separated food components conveniently just before eating them. Most fast food is sold in a form in which the individual food components are already combined at the time of purchase thereby requiring immediate consumption if the qualities, texture and flavor for example, of the individual food components are to be enjoyed. Both retailers and consumers need packaged fast food products that are easily stored for long periods of time, readily combined from individual components into finished products and still preserve the qualities of the individual food components. Further, because most consumers associate fast-food with junk-food, there is a need for packaged fast-food products that are more nutritious than conventional fast food and snack items.

The prior art discloses numerous packaged food products that separate individual food components and allow for their combination just prior to consumption. Seaborne, U.S. Pat. No. 4,874,618, discloses a two-compartment food package having an edible barrier which separates food contained within the two compartments. Slangan, U.S. Pat. No. 4,233,325, discloses a two-compartment food package having an inedible barrier which separates food contained within the two compartments. Both of these approaches heat chocolate syrup in a microwave oven and allow the heated syrup to spill over ice cream contained in a microwave-insulated compartment. However, in neither of the devices is the food compartment itself edible as is disclosed in the present invention.

Other two-component food products have chosen to eliminate mechanical barriers, edible and inedible, and have instead produced moisture-resistant coatings which, when applied to the inside of an outer food component, allow separation from an inner food component. Rubenstein, U.S. Pat. No. 4,390,553, discloses such an edible moisture-resistant coating made out of food-grade fats that are applied to the inside of an edible food container. Bank, U.S. Pat. No. 4,472,440, also discloses an edible moisture-resistant coating applied to the inside of a baked container which allows the food components to be mixed together and maintain freshness for six hours or more. These devices, however, create problems generated by the texture and taste which a fatty coating imparts to food items and the adverse health risks associated with adding more fat and other unhealthy ingredients to the American diet. Further, these devices are limited in the amount of time that the coatings can maintain moisture resistance.

Finally, some two-component food products have forgone barrier methods and have instead relied upon immediate consumption or storage methods such as freezing to maintain food quality for food products made up of a combination of individual food components. Burger, U.S. Pat. No. 5,236,724, discloses a filled bagel product having an outer edible food container made of bagel dough and an inner scoop of cream cheese, both which are slightly cooked, allowing frozen storage over long periods of time. However, this device does not have a barrier between the two food components and it also relies upon a cooking and freezing process in order to keep the two components fresh. This device also does not provide a food product which is ready to eat directly from the stored condition.

OBJECTS OF THE INVENTION

Accordingly, it is an object of the present invention to provide a novel packaged salad sandwich that temporarily separates a sandwich fill from an edible shell using a tear-away bag which allows removal of the bag while allowing the sandwich fill to remain inside the edible shell.

It is another object of the invention to provide a salad sandwich that separates an edible shell from a sandwich fill by use of an inner bag having a weakened tear line allowing the inner bag to be opened and removed from the edible shell without removing the sandwich fill from the edible shell.

Another object of the invention is to provide a salad sandwich that separates an edible shell from a sandwich fill by use of an inner bag having a weakened tear line that follows a substantially helical path around the inner bag.

Another object of the invention is to provide a salad sandwich that separates an edible shell from an inner sandwich fill by use of an inner bag having a tear string integrated into the inner bag.

Another object of the invention to provide an inner bag for separating an edible shell from an inner sandwich fill where an integrated tear string follows a substantially helical path around the bag.

Another object of the invention is to provide a conveniently prepackaged salad sandwich that can be held with one hand and eaten without the use of utensils, while simultaneously driving, walking, reading and the like.

Another object of the present invention is to provide a salad sandwich that is compact and can be easily stored so that many different distribution outlets are possible, such as fast food franchises, vending machines and grocery stores.

Another object of the invention is to provide a salad sandwich that can be lifted out of its box using an outer bag so that the salad sandwich can be eaten in bite-sized portions.

It is also an object of the invention to provide a salad sandwich that traps any loose food debris generated during consumption of the sandwich through the use of an integrated crumb bag.

Another object of the present invention to provide a salad sandwich that can be bought, stored and eaten at a later time due to an inner bag which allows the sandwich fill to remain fresh for relatively long periods of time.

Another object of the invention is to provide a salad sandwich that has a simple construction and is inexpensive to manufacture.

It is another of the invention to provide a salad sandwich that has a sandwich fill which may be eaten cold, at room temperature or hot.

Another object of the invention is to provide a method for packaging a ready to eat salad sandwich having an edible shell, an inner sandwich fill and an easily removable bag separating the two components.

SUMMARY OF THE INVENTION

The above objects, as well as further objects and advantages of the invention, are achieved by a ready-to-eat packaged salad sandwich made up of an edible shell and a sandwich fill which are separated by a moisture-resistant flexible bag having a tear-away mechanism for removing the bag from the salad sandwich while allowing the sandwich fill to remain inside the edible shell. The entire structure, consisting of the edible shell containing the flexible bag and the sandwich fill, may be enclosed within an outer crumb bag. The outer crumb bag works in cooperation with a rigid outer container, such as a common packaging box, to provide the dual purposes of allowing the salad sandwich to be lifted out of the rigid container during consumption and to provide a fold-over crumb tray to collect crumbs falling from the salad sandwich when it is being eaten.

The edible shell is composed of baked corn-flour dough or it may be made from similar materials including pastry doughs, bread doughs and the like. The corn-flour dough is baked so that the edible shell has a crunchy texture like a taco shell. However, if the edible shell is made of pocket breads or dessert pastries, it will result in an edible shell having a softer texture. The edible shell is formed into a shape suitable for containing the sandwich fill. The shapes may be that of a rectangular box, as is shown in the attached drawings, or the edible shell can have a pocket shape, tubular shape or any shape suitable for containing the sandwich fill.

The sandwich fill consists of any number of common substantially solid sandwich fillers such as salad mix, tuna salad, chicken salad, or taco salad, but it may be adapted to include any other edible food products. The sandwich fill may include hot or cold type fills. The novel packaging of the sandwich fill allows the edible shell to be filled with any number of salads or food fillers and to be stored for a relatively long period of time. This capability allows for an extended shelf life of the salad sandwich beyond that of conventional foods which are combined and sold shortly before their sale.

The flexible tear-away bag that holds the sandwich fill is preferrably made of polymeric plastic or vinyl compounds but it may be made of waxed paper or other environmentally conscious materials. The tear-away bag functions to preserve the sandwich fill for a longer period of time than has been available in combined foods because it is relatively moisture resistant, relatively air tight and simply and easily removable from the edible shell. The tear-away bag could be vacuum sealed or gas filled. The tear-away bag can also be adapted to allow for a sandwich fill that can be heated. The tear-away bag functions by having a consumer pull a designated corner of the bag which allows the bag to unravel inside the edible shell and be removed. The sandwich fill is then released within the shell and the combination food product may then be enjoyed. The tear-away bag contains a tear string or tear strip integrated into the bag material or it can unravel along a weakened line built into the bag.

The method of packaging of the salad sandwich is accomplished by starting with a tear-away bag as described above, filling the bag with a suitable sandwich filler and sealing the bag. The tear-away bag is provided with a mechanism that will let the bag be removed from the shell while allowing the sandwich fill to remain inside the edible shell. The filled bag is then put into an edible shell. Once the filled bag is in the edible shell, the salad sandwich may be wrapped and stored for relatively long periods of time until it is to be eaten.

The invention is particularly suited for use in situations where the edible shell and sandwich fill are produced and packaged one or two weeks in advance and the salad sandwich is offered for sale in a retail environment where customers desire a nutritious and high-quality food product. Since many types of edible shells, as well as many different kinds of sandwich fills, are contemplated by the invention, the salad sandwich is likely to find widespread acceptance in many types of retail establishments.

The above objects and advantages of the present invention can be readily derived from the following detailed description of the drawings taken in conjunction with the accompanying drawings and claims present herein and should be considered as within the overall scope of the invention.

BRIEF DESCRIPTION OF THE DRAWINGS

FIG. 3 is a front view of the salad sandwich with a two-piece shell showing the location of cross section lines 4—4 and 5—5.

FIG. 4 is a cross sectional view of the salad sandwich taken along section line 4—4 and shows the shell in cross section but does not show the tear-away bag or the sandwich fill in cross section.

FIG. 5 is a cross sectional view of the salad sandwich taken along line 5—5 which shows the shell, the tear-away bag and the sandwich fill in cross-section.

DETAILED DESCRIPTION OF THE INVENTION

Figure 1:
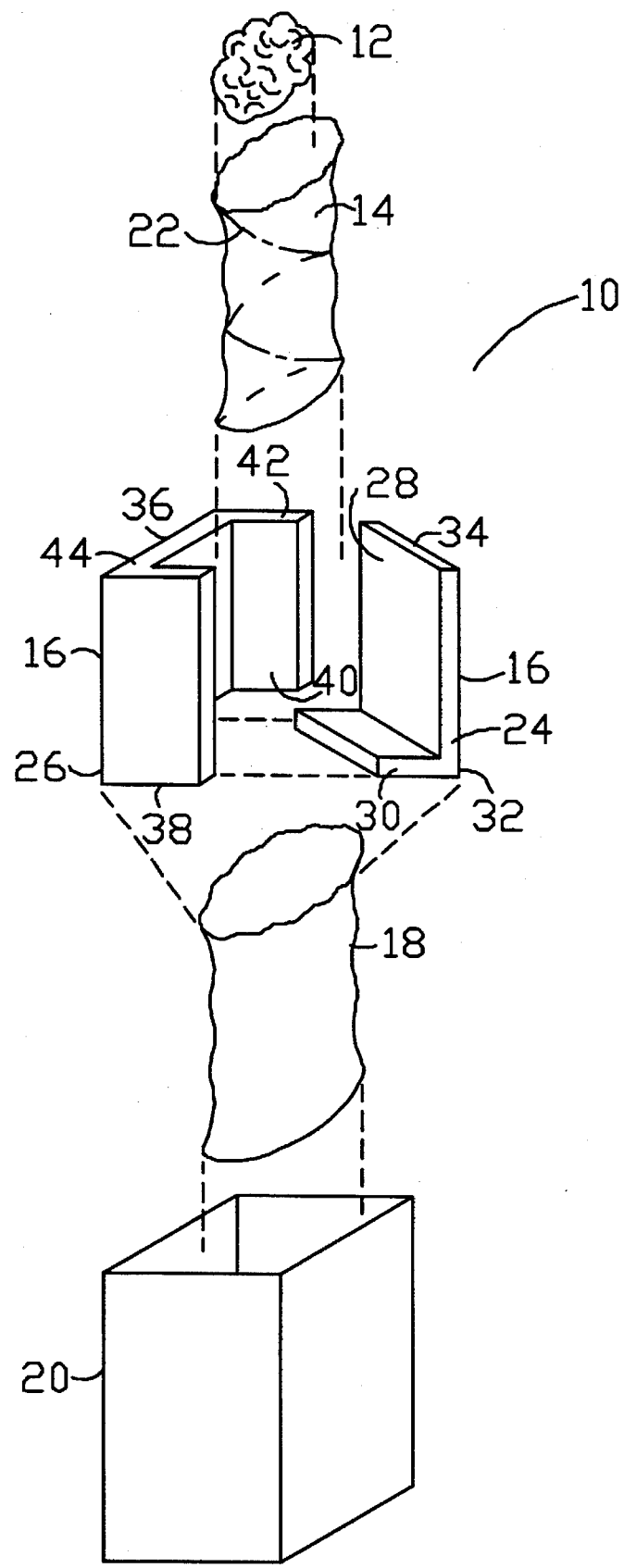
FIG. 1 is an exploded view showing assembly of the component parts of the salad sandwich.

FIG. 1 is an exploded view showing assembly of the component parts of the salad sandwich. In FIG. 1, a salad sandwich 10 comprises a sandwich fill 12 contained in a tear-away bag 14 which is housed in an edible shell 16. The edible shell 16 fits in a crumb bag 18 and the sandwich fill 12, the tear-away bag 14, the edible shell 16 and the crumb bag 18 may be packaged in a suitable container 20. The sandwich fill 12 may consist of substantially solid various types of sandwich fill including garden salads, or any other edible food products. The sandwich fill 12 may be a cold or hot food filler. Other types of sandwich fill 12 may also be used and examples of some preferred embodiments of the sandwich fill 12 are tuna salad, egg salad, garden salad, pasta salad, chicken salad, gyro fillings and dessert fillings such as custard, ice cream, or yogurt. The sandwich fill 12 may be deposited into the tear-away bag 14 by hand or the salad sandwich 10 may be adapted to be produced according to commonly used food manufacturing processes known by those skilled in the art. The tear-away bag 14 provides a limiting factor for determining the quantity of sandwich fill 12 which is deposited into the tear-away bag 14. However, many different sizes of tear-away bags and therefore salad sandwiches 10 may be produced depending upon marketing factors and manufacturing considerations.

The tear-away bag 14 is shown in FIG. 1 having a tear string 22. The tear string 22 is integrated into the tear-away bag 14 allowing the tear-away bag 14 to be opened and the sandwich fill 12 to be released in the edible shell 16. In a preferred embodiment, the tear string 22 may be constructed as a heat-weakened region in the tear-away bag 14 or as an integrated fiber imbedded into the tear-away bag 14. In a preferred embodiment, the tear-string 22 traces a substantially helical path around the circumference of the tear-away bag 14. This construction allows the tear-string 22 to be pulled away, similar to pulling the strip from a gum wrapper, which allows the tear-away bag 14 to be unraveled. The tear-away bag 14 unravels like the opening of a common cylinder of paperboard, for example, unravelling the tube found inside a roll of paper towels. Other embodiments are also contemplated, such as folding techniques which allow the tear-away bag 14 to be removed while the sandwich fill 12 is easily released into the edible shell 16. The tear-away bag 14 is shown in FIG. 1 having a cylindrical shape, although in other embodiments the tear-away bag 14 may be constructed having two or more panels secured together to form a container for the sandwich fill 12.

The tear-away bag 14 may be constructed of polymeric vinyl or plastic compounds such as polyethylenes, polyesters, cellophanes and the like, or the tear-away bag 14 may be constructed of wax papers or other suitable materials known by those skilled in the art. In a preferred embodiment of the invention, the tear-away bag 14 is constructed of material similar to common sandwich bags. However, the bag material must allow the sandwich fill 12 to maintain freshness and retain moisture for long periods of time. The tear-away bag 14 may be vacuum-sealed or filled with a gas such as nitrogen to preserve the sandwich fill 12. Further, the tear-away bag 14 may be constructed to allow the sandwich fill 12 to be heated while inside the edible shell 16.

The edible shell 16 is shown in FIG. 1 in a preferred embodiment of the invention having two components, an L-shaped member 24 and a U-shaped member 26. The L-shaped member 24 and the U-shaped member 26 derive their names from the shapes of their respective cross-sections. The L-shaped member 24 has a wall 28 and a lip 30 attached at a closed end 32. The wall 28 also has a corresponding unattached open end 34. The U-shaped member 26 has a flat part 36 and two flanges 38 and 40 attached on opposite sides 42 and 44 respectively of the flat part 36. Upon assembly of the two-component embodiment of the edible shell 16, the L-shaped member 24 and the U-shaped member 26 are placed with the wall 28 of the L-shaped member 24 parallel to the flat part 36 of the U-shaped member 26. Thus placed, the lip 30 of the L-shaped member 24 and the two flanges 38 and 40 of the U-shaped member 26 form an open-ended rectangular edible shell 16 in which the tear-away bag 14 contains the sandwich fill 12. The two-component embodiment allows for the edible shell 16 to receive an appropriate amount of sandwich fill 12 while providing a structural mechanism to prevent breakage of the edible shell 12. During manufacture of the edible shell 16 by a person skilled in the art, the edible shell 16 may also be constructed to allow for other embodiments of the shell, such as a one-piece shell, a pocket shape, a tubular shape or any other shape that contains sandwich fill 12 and provides a sturdier salad sandwich 10. The edible shell 16 is composed of a corn flour dough to create a consistency similar to taco shells in a preferred embodiment, although shell compositions utilizing other types of edible materials are within the scope of the invention.

The crumb bag 18 contains the edible shell 16, the tear-away bag 14, and the sandwich fill 12. The crumb bag 18 may be constructed of polymeric plastics and vinyls similar to the tear-away bag 14. However, the crumb bag 18 does not have any sort of tearing mechanism in the preferred embodiment. The crumb bag 18 may function with the box 20 in such as way as to allow the crumb bag 18 to be pulled down the outside of the box 20 with the result that the edible shell 16 and sandwich fill 12 are incrementally lifted out of the box 20 as the salad sandwich 10 is eaten. The crumb bag 18 also keeps the edible shell 16 fresh. The crumb bag 18 can also be folded over the box 20 in such a way that crumbs falling from the salad sandwich 10 while it is being eaten land upon the portion of the crumb bag 18 which is draped out of the box 20; thus the origin of the name of the element, the crumb bag 18.

Figure 2:
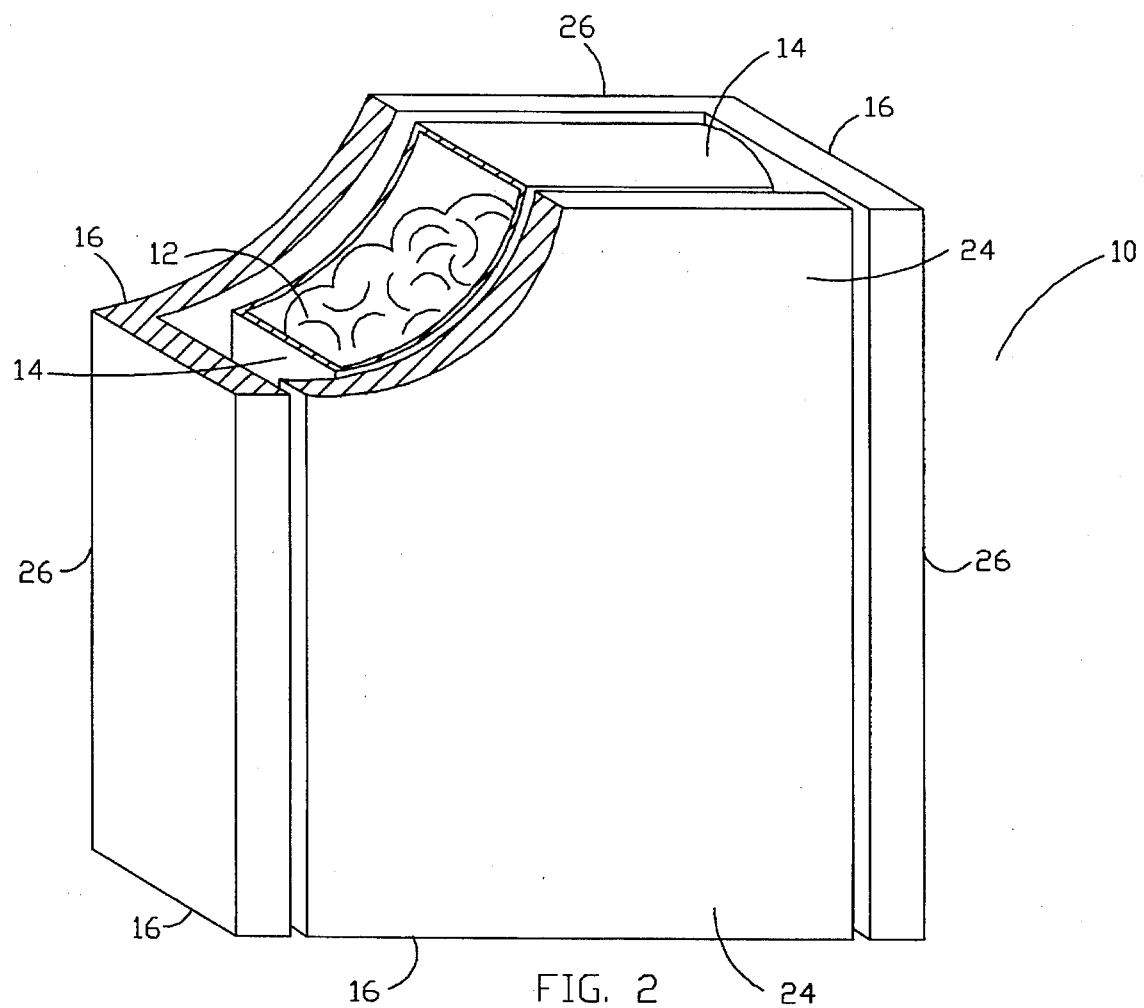
FIG. 2 is a cut-away sectional view of an embodiment of the invention showing the shell, the sandwich fill contained within the shell and the sandwich fill separated from the shell by the tear-away bag.

FIG. 2 is a cut-away sectional view of an embodiment of the invention. In FIG. 2, a salad sandwich is shown comprising an edible shell 16, the sandwich fill 12 inside the edible shell 16, and the sandwich fill 12 separated from the edible shell 16 by the tear-away bag 14. FIG. 2 shows how the edible shell 16 may be made with an L-shaped member 24 and a U-shaped member 26 as a two-component embodiment of the edible shell 16. The L-shaped member 24 and the U-shaped member 26 are cooperatively positioned to provide an edible shell 16 which houses the tear-away bag 14 and sandwich fill 12.

FIG. 3 is a front view of the salad sandwich 10 with a two-piece edible shell 16 showing the location of cross section lines 4—4 and 5—5. In FIG. 3, the edible shell 16 is constructed of two pieces, L-shaped member 24 and U-shaped member 26. FIG. 3 shows the wall 28 of L-shaped member 24 and flanges 38 and 40 of the U-shaped member 26. In FIG. 3, the salad sandwich 10 is shown with the L-shaped member 24 and the U-shaped member 26 cooperatively positioned into an assembled edible shell 16 which allows the edible shell 16 to house the tear-away bag and sandwich fill (not shown here).

FIG. 4 is a cross sectional view of the salad sandwich 10 taken along section line 4—4 and shows the edible shell 16 in cross section but does not show the tear-away bag 14 or the sandwich fill 12 in cross section. In FIG. 4, an internal side view of the tear-away bag 14 shows tear string 22 running substantially helically around the tear-away bag 14. Since the tear-away bag 14 is constructed of polymeric vinyl, plastics or fiber-based compounds it may be transparent or relatively opaque as shown in FIG. 4. In FIG. 4, the salad sandwich 10 is shown having an edible shell 16 with a two-piece shell construction. The edible shell 16 includes L-shaped member 24 and U-shaped member 26 as previously described. FIG. 4 shows how the L-shaped member 24 of edible shell 16 has a wall 28 attached to lip 30. FIG. 4 also shows how the U-shaped member 26 of the edible shell 16 has a flat part 36, which is shown in cross section and cooperatively positioned with L-shape$_d$ member 24 to house the tear-away bag 14. The flanges 38 and 40 of U-shaped member 26 are not shown due to the location of cross section line 4—4.

FIG. 5 is a cross sectional view of the salad sandwich 10 taken along line 5—5. In FIG. 5, the edible shell 16, the tear-away bag 14, and the sandwich fill 12 are all shown in cross-section. FIG. 5 shows by cross section the cooperative positioning of the L-shaped member 24 and U-shaped member 26 in order to contain the tear-away bag 14. However, the tear-away bag 14 and the sandwich fill 12 are also included in cross section showing how the sandwich fill 12 is stored inside tear-away bag 14. FIG. 5 also shows how the sandwich fill 12 does not come into contact with the edible shell 16 until the tear-away bag 14 is removed just before the entire salad sandwich 10 is to be eaten. Further, FIG. 5 shows how the edible shell 16 would be able to expand and avoid breakage. Should the sandwich fill 12 be added to the tear-away bag 14 in excessive amounts or if the sandwich fill 12 should settle in such a way as to put outward pressure on the edible shell 16, L-shaped member 24 can automatically adjust out and away from the U-shaped member 26 to prevent breakage.

Figure 6:
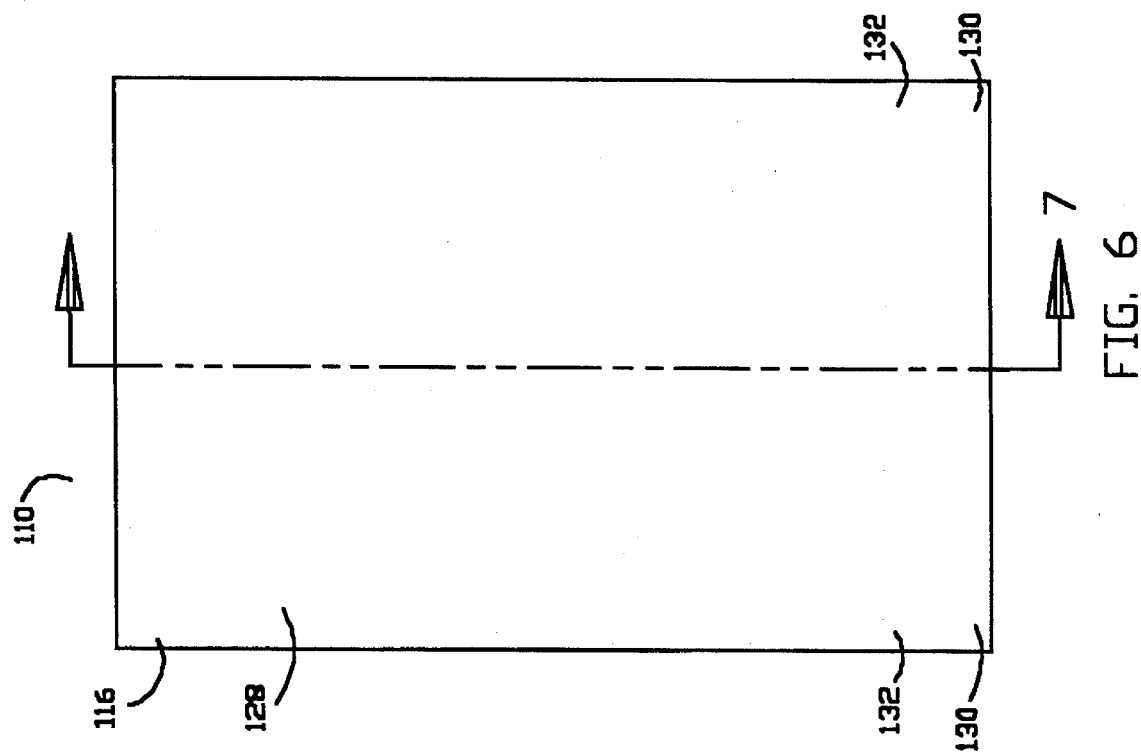
FIG. 6 is a front view of the salad sandwich with a one-piece shell showing the location of cross section line 7—7

FIG. 6 is a front view of the salad sandwich 110 with a one-piece edible shell 116 and shows the location of cross section line 7—7. In FIG. 6, the edible shell 116 has a first wall member 128 which is shown facing the viewer. A second wall member 136 is opposite the first wall member 128 and is not shown. A base 130 is shown in FIG. 6 and is connected to the first wall member 128 at the proximal end 132 of the wall member 128. Section line 7—7 is located to allow for a cross-sectional view of the one-piece edible shell 116.

Figure 7:
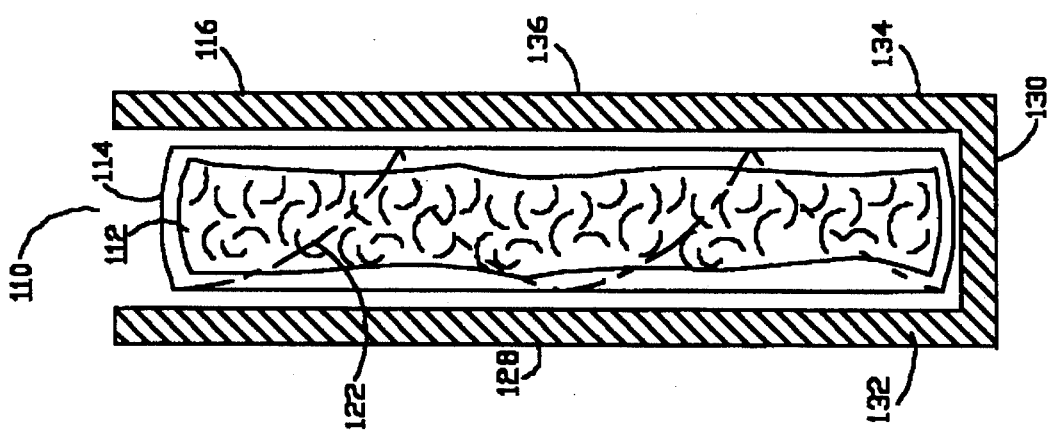
FIG. 7 is a cross sectional view of the salad sandwich with a one-piece shell.

FIG. 7 is a cross-sectional view along section line 7—7 of the salad sandwich 110 having a one-piece edible shell 116. In FIG. 7, an assembled salad sandwich 110 having a one piece edible shell 116 houses a tear-away bag 114 which contains a sandwich fill 112. The edible shell 116 has a first wall member 128 and a second wall member 136 positioned in a parallel manner similar to the embodiment shown in FIGS. 3 and 4, although the wall members 128 and 136 are attached by way of a base 130. The base 130 perpendicularly attaches to each of the first and the second walls, 128 and 136, at the proximal end 132 of the first wall member 128 and at the proximal end 134 of the second wall member 136. The one-piece edible shell 116 may be advantageous where the edible shell 116 is made from less brittle material, such as breads or pastries, or where manufacturing capabilities allow for the efficient production of the edible shell 116; for example, a one-piece mold may be poured to produce the edible shell 116 or an extrusion type method could be used to produce the edible shell 116. Further, the one-piece shell 116 may be more advantageous from the standpoint of providing a better container for the sandwich fill 112 during consumption of the salad sandwich 110 because of its one-piece construction.

Figure 8:
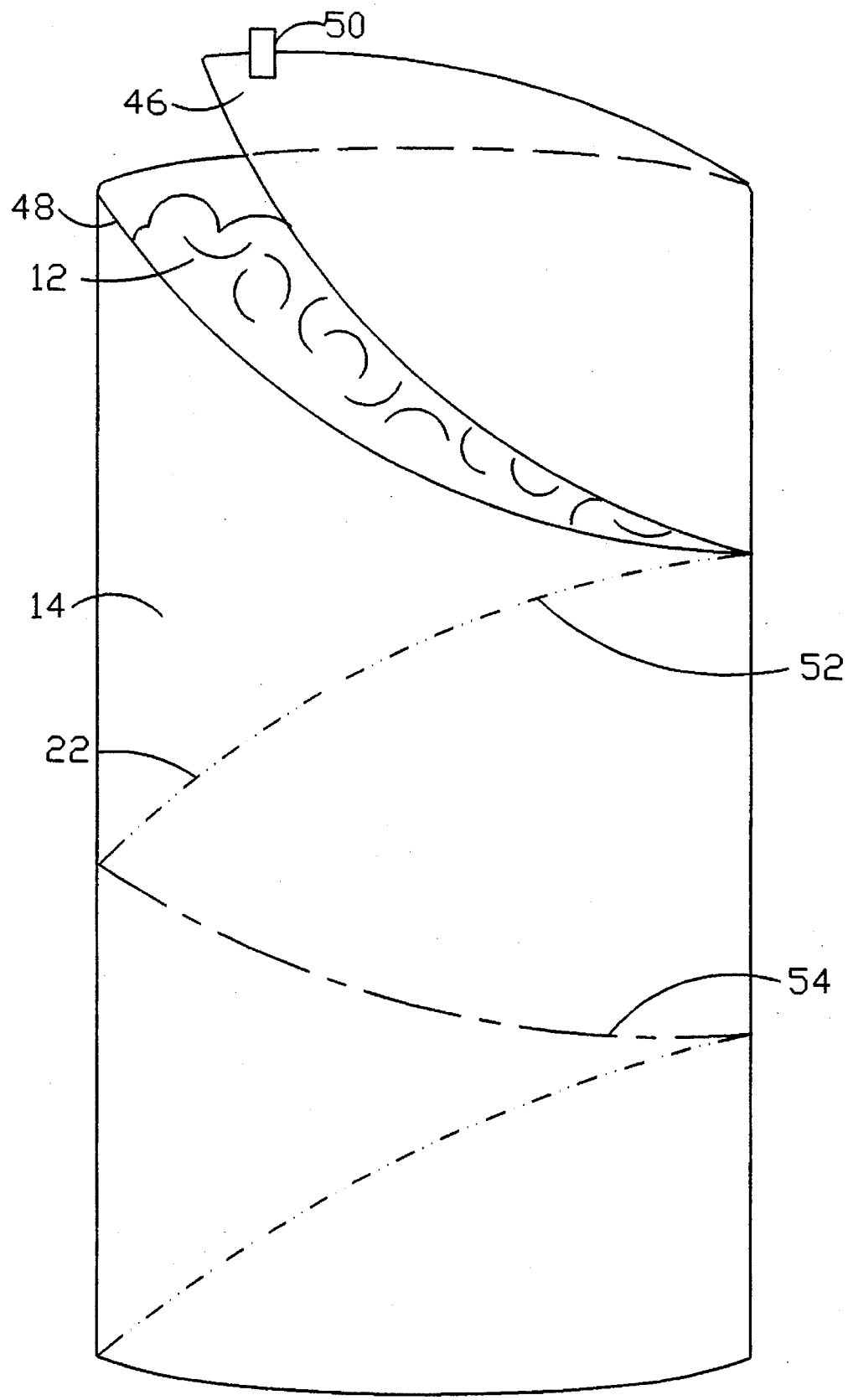
FIG. 8 is a front perspective view of an embodiment of the tear-away bag showing the bag in a partially opened position.

FIG. 8 is a front perspective view of an embodiment of the tear-away bag 14 showing the tear-away bag 14 in a partially opened position. FIG. 8 shows the tear-away bag 14 having a cylindrical shape with the tear string 22 shown in partial disassembly of the tear-away bag 14 into a linear shape. The tear string 22 separates and exposes a first marginal edge 46 and a second marginal edge 48 of the tear string 22. A pull tab 50 is preferably located on an upper corner 56 of the tear-away bag 14 to facilitate the opening and removal of the tear-away bag 14 along the tear string 22. Further, the tear-away bag 14 is shown in front planar view resulting in the tear string 22 having a hidden tear line 52 and a visible tear line 54 according to the viewer. The tear-away bag 14 in FIG. 8 is shown constructed of a clear material such as polymeric plastics or vinyls, however, the tear-away bag 14 may be constructed of other materials which can serve as moisture barriers for the edible shell, keep the sandwich fill fresh, and are simply and easily removable along a tear string 22. Other preferred embodiments of the tear-away bag 14 may allow for the sandwich fill 12 to be heated while in the tear-away bag 14 or which may allow the salad sandwich 10 to go directly from the freezer to the microwave oven.

Although in the foregoing detailed description the present invention has been described by reference to various specific embodiments, it is to be understood that modifications and alterations in the structure and arrangement of those embodiments other than those specifically set forth herein may be achieved by those skilled in the art and that such modifications and alterations are to be considered as in the overall scope of this invention.

I claim:

1. A ready-to-eat salad sandwich comprising:
   a. an edible shell comprising a baked dough product, said edible shell having an opening;
   b. a moisture-resistant flexible tear-away bag removably disposed inside said edible shell, said edible shell substantially enclosing said bag except for said opening in said edible shell;
   c. a substantially solid sandwich fill disposed inside said bag disposed inside said edible shell, said bag separating said sandwich fill from said edible shell, said bag with said sandwich fill disposed therein having a width substantially equal to said opening in said edible shell;
   d. tear-away means incorporated onto said bag for permitting said bag to be torn open and unravel while said bag is in said edible shell, said tear-away means being configured such that said sandwich fill remains substantially inside said edible shell as said bag is torn and unravels and is removed from said edible shell through said opening in said edible shell, wherein said tear-away means comprises a weakened tear line forming a substantially helical configuration along said bag.

2. The ready-to-eat salad sandwich of claim 1 further comprising:
   a. a flexible crumb bag containing said edible shell and said tearaway bag: and
   b. a rigid container housing said flexible crumb bag, said edible shell and said tearaway bag.

3. A method for making a ready-to-eat salad sandwich comprising the steps of:
   a. providing an edible shell comprising a baked dough product, said edible shell having an opening;
   b. inserting a moisture resistant flexible tearaway bag removably disposed inside said edible shell, said edible shell substantially enclosing said bag except for said opening in said edible shell; said bag containing a substantially solid sandwich fill disposed inside said bag disposed inside said edible shell, said bag separating said sandwich fill from said edible shell, said bag with said sandwich fill disposed therein having a width substantially equal to said opening in said edible shell;
   c. providing said bag with tear-away means incorporated into said bag, for permitting said bag to be torn open and unravel while said bag is in said edible shell, said tear-away means being configured such that said sandwich fill remains substantially inside said edible shell as said bag is torn and unravels and is removed from said edible shell through said opening in said edible shell, wherein said tear-away means comprises a weakened tear line forming a substantially helical configuration along said bag.

4. The method of claim 3 further comprising the additional steps of:
   a. providing a flexible crumb bag;
   b. inserting said edible shell and said tearaway bag in said flexible crumb bag;
   c. providing a rigid container; and
   d. inserting said flexible crumb bag, said edible shell, and said tear-away bag in said rigid container.

\* \* \* \* \*